United States Patent
Seal et al.

(10) Patent No.: US 11,144,401 B2
(45) Date of Patent: Oct. 12, 2021

(54) COMPONENT AWARE INCREMENTAL BACKUP, RESTORE, AND RECONCILIATION SOLUTION

(71) Applicant: VMware, Inc., Palo Alto, CA (US)

(72) Inventors: Abhijit Seal, San Jose, CA (US); Harsh Kumar, San Jose, CA (US); Md. Borhan Uddin, Fremont, CA (US); Sachin Tiwari, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 250 days.

(21) Appl. No.: 16/193,656

(22) Filed: Nov. 16, 2018

(65) Prior Publication Data

US 2020/0159413 A1   May 21, 2020

(51) Int. Cl.
*G06F 11/14* (2006.01)
*G06F 3/06* (2006.01)

(52) U.S. Cl.
CPC .......... *G06F 11/1458* (2013.01); *G06F 3/065* (2013.01); *G06F 3/0619* (2013.01); *G06F 3/0643* (2013.01); *G06F 3/0673* (2013.01); *G06F 11/1451* (2013.01); *G06F 11/1469* (2013.01)

(58) Field of Classification Search
CPC .............. G06F 11/1451; G06F 11/1464; G06F 11/1469; G06F 16/10; G06F 11/1458; G06F 11/1435; G06F 11/1446
See application file for complete search history.

(56) References Cited

U.S. PATENT DOCUMENTS

| | | | | |
|---|---|---|---|---|
| 9,424,265 | B1 * | 8/2016 | Sui | G06F 16/284 |
| 9,501,365 | B2 * | 11/2016 | Parab | G06F 11/1458 |
| 10,140,051 | B1 * | 11/2018 | Sun | G06F 3/0614 |
| 2011/0153567 | A1 * | 6/2011 | Sawdon | G06F 16/188 |
| | | | | 707/645 |
| 2012/0117029 | A1 * | 5/2012 | Gold | G06F 11/1451 |
| | | | | 707/651 |
| 2015/0244795 | A1 * | 8/2015 | Cantwell | H04L 67/1095 |
| | | | | 709/202 |

* cited by examiner

*Primary Examiner* — Reginald G Bragdon
*Assistant Examiner* — Thanh D Vo
(74) *Attorney, Agent, or Firm* — Patterson + Sheridan, LLP

(57) ABSTRACT

A system and method of performing an incremental backup process are disclosed. In certain aspects, the method comprises retrieving a first metadata associated with a previous backup process of a component from a backup location in a storage. The method further comprises passing the first metadata to the component for determining incremental backup data of the component corresponding to a difference between current data of the component and data of the component associated with the previous backup process. The method further comprises receiving information indicative of the incremental backup data from the component. The method further comprises receiving, from the component, a second metadata associated with the incremental backup process. The method also comprises storing the incremental backup data and the second metadata as associated with the incremental backup process.

21 Claims, 4 Drawing Sheets

COMPONENT AWARE INCREMENTAL BACKUP, RESTORE, AND RECONCILIATION SOLUTION

BACKGROUND

Backup software running on a computing device typically performs a backup of a software component (e.g., running on the computing device or another device) to generate backup data (e.g., files, etc.) associated with the component. A software component refers to any software program, portions of a software program, or group of programs. Also, a "backup" refers to a backup process, operation, or procedure while "backup data" or "backup data segment" refers to the data that is actually stored as a result of a backup process. In a full backup, full backup data is generated that includes all the data of the software component at the time the full backup is performed. In an incremental backup, incremental backup data is generated. Incremental backup data of a component only includes data of the component that has changed as compared to backup data generated as a result of a previous backup (e.g., last backup) of the component.

Configuring backup software to determine only the data that has changed as compared to a component's previous backup data, however, is challenging. For example, in order to determine the change in data, existing snapshot-based backup solutions generate block-level checksums of all data blocks (also referred to as "component data blocks") associated with a current state of the component. The snapshot-based backup solution then compares those checksums with previously generated checksums of data blocks associated with a past state of the component at a time when the previous backup data was generated. In such snapshot-based backup solutions, because the comparison of the checksums is performed at the block level, the backup solution may identify any changed data block of the component as a data block that needs to be included in the incremental backup data. However, not every changed data block necessarily needs to be included in the incremental backup. For example, changes in some data blocks associated with the component (e.g., changes in some files associated with the component) may not be important enough to the operation of the component to be backed up. As a result, many existing backup solutions perform unnecessary backups or generate incremental backup data that are larger in size than needed. This results in longer time and compute cycles to perform backup and restore procedures for the component, as well as an increase in storage costs for storing the corresponding backup data.

DETAILED DESCRIPTION

Certain aspects described herein relate to providing a component aware incremental backup, restore, and reconciliation solution. In certain aspects, the component aware incremental backup, restore, and reconciliation solution described herein provides a solution for a component to independently, or with the assistance of a backup manager, determine whether to perform a full backup or an incremental backup of data associated with the component. The solution further generates metadata associated with the backup that later enables the component to independently, or with the assistance of a backup manager, identify the data that has changed as compared to the previous backup data, and determine which portion of the changed data should be backed up. In certain aspects, the component aware incremental backup, restore, and reconciliation solution described herein also provides a solution for a component to be restored based on one or more backup data segments (e.g., backup data 118a-118c) associated with one or more backups (e.g., including one or more incremental backups) of the component and the metadata associated with the one or more backup data segments. For example, the metadata may indicate a location in storage of the one or more backup data segments, indicate which data associated with the component resides in which backup data segment, etc. In certain aspects, the component aware incremental backup, restore, and reconciliation solution described herein also provides a mechanism for each component to be reconciled before the restore operation is complete. As further described below, a component is reconciled with the state it was in prior to the restore operation in order to, for example, be in sync with other systems that the component may be managing or sharing information with.

Figure 1:
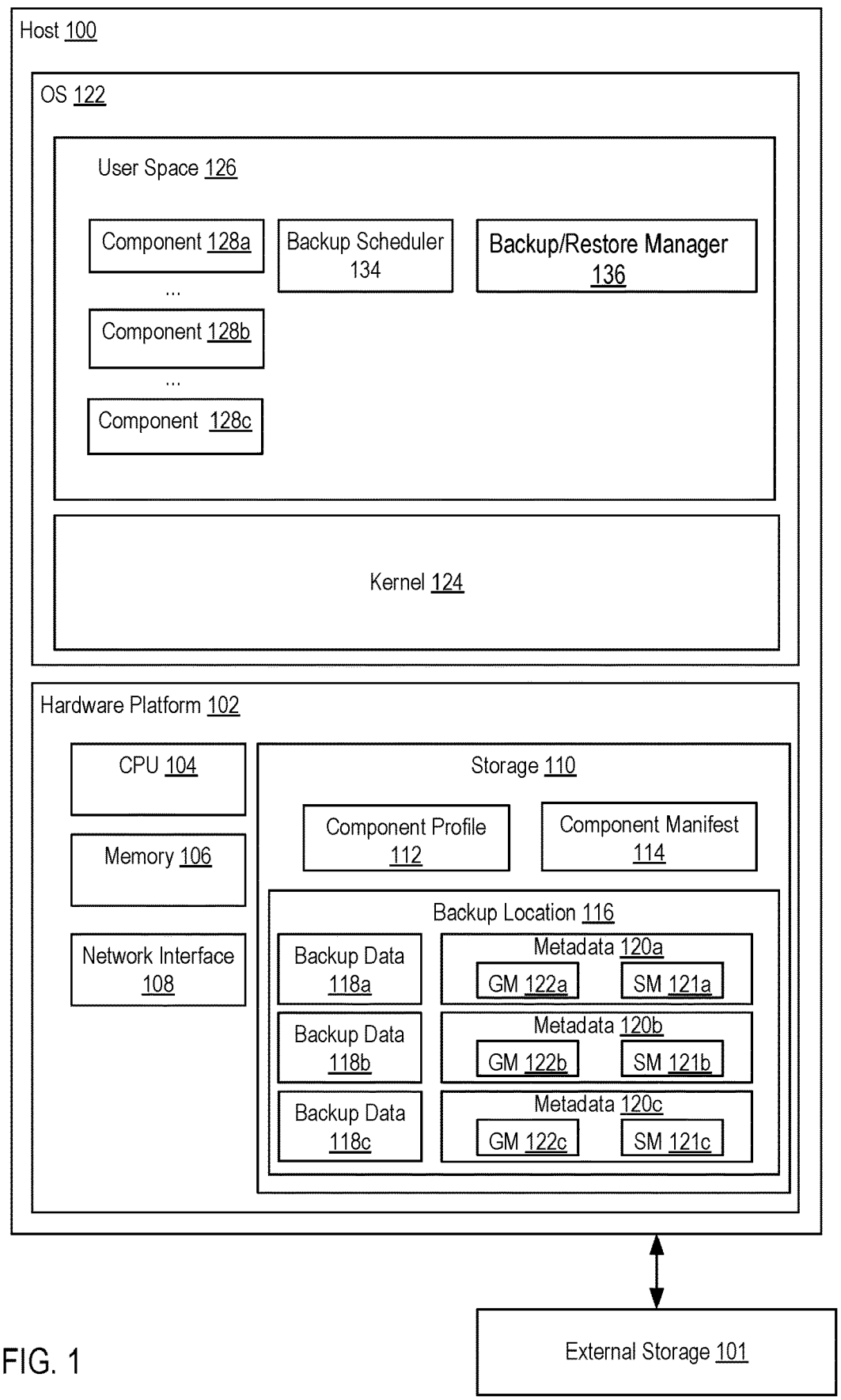
FIG. 1 depicts a block diagram of a computing system in which one or more embodiments of the present disclosure may be utilized.

FIG. 1 illustrates a computer system, shown as host 100, which, in certain aspects, performs the operations described herein. As shown, host 100 comprises hardware platform 102, including central processing unit (CPU) 104, memory 106 (e.g., random access memory), network interface 108, and storage 110 (e.g., one or more disk drives, flash memory, etc.). Though storage 110 is shown internal to host 100, it should be noted that storage 110 may additionally or alternatively be external to host 100. CPU 104 is configured to execute instructions such as executable instructions that perform one or more of the operations described herein. The executable instructions may be stored in memory 106 and/or in storage 110. Network interface 108 enables host 100 to communicate with other devices, such as network accessible storage devices, via a communication medium, such as a network. Network interface 108 may include one or more network adapters or ports, also referred to as Network Interface Cards (NICs), for connecting to one or more physical networks.

Storage 110 provides a backup location 116 representing storage resources within storage 110 that are used for storing backup data relating to one or more components 128a-128c executing in an operating system (OS) 122 of host 100. As shown, backup location 116 comprises different backup data 118a-c, each having corresponding metadata 120a-c. In certain aspects, backup data 118a-c may all be associated with one component, such as component 128a. For example, backup data 118a may include full backup data resulting from a full backup of component 128a while backup data 118b and 118c may each include incremental backup data associated with an incremental backup of component 128a. Incremental backup data associated with an incremental backup includes data that changed as compared to component 128a's previous backup data.

As used in an example herein, component 128 may refer to any one of components 128a-c, "backup data 118" may refer to any one of backup data 118a-c, "metadata 120" may refer to one of metadata 120a-c corresponding to any one of backup data 118a-c, "general metadata (GM) 122" may refer to one of general metadata 122a-c, and "specific metadata (SM) 121" may refer to one of specific metadata 121a-c corresponding to any one of backup data 118a-c. For example, when backup data 118 is generated by component 128 or BR manager 136, corresponding metadata 120 is generated and stored with backup data 118. In certain aspects, metadata 120 is generated by component 128 or backup/restore (BR) manager 136.

Metadata 120 comprises GM 122 as well as SM 121. In certain aspects, BR manager 136 is configured to generate metadata 120, including GM 122 and SM 121, while, in certain other aspects, component 128 whose data is being backed-up is configured to generate metadata 120. Also, in certain aspects, one of GM 122 and SM 121 is generated by component 128 while the other one is generated by BR manager 136. For example, in certain aspects, component 128 generates SM 121 while BR manager 136 generates GM 122.

GM122 comprises general information relating to backup data 118, such as the size of backup data 118, the component that the backup data is associated with, etc. SM 121 comprises information (e.g., whether any previous incremental backup has been performed for component 128 etc.) that enables a component 128 to independently, or with the assistance of BR manager 136, determine whether to perform a full backup or an incremental backup. SM 121 also comprises information that enables a corresponding component 128 to independently, or with the assistance of BR manager 136, identify data that has changed as compared to the previous backup data of component 128. As an example, SM 121c may comprise a list of all the files (e.g., flat files) that have been backed-up for a corresponding component as well as hashes or checksums of all the files. SM 121c may also comprise information relating to which file has been backed-up as part of which backup.

To illustrate this with an example, in its current state, a component such as component 128a running in OS 122 may have ten files, e.g., files 1-10. Files 1-7 may have been backed-up by previous backups associated with backup data 118a and 118b; the backup associated with backup data 118b being the last backup. Files 2 and 3 may have changed and files 8-10 may have been added by component 128a as compared to the last backup. In such an example, backup data 118c corresponds to data associated with an incremental backup of files 2-3 and 8-10. As a result, SM 121c, corresponding to backup data 118c, is generated to indicate that backup data 118c stores the changed version of files 2-3 and 8-10. In certain aspects, for files that are not a part of backup data 118c (i.e., files 1 and 4-7), SM 121c includes pointers to metadata 120b and metadata 120a, which indicate that backup data 118a and 118b are associated with files 1 and 4-7. As such, SM 121 enables component 128a to determine the difference in data as compared to component 128's previous backup data. As further described below, SM 121 also enables BR manager 136 to keep track of all the backup data from which different files need to be restored.

In certain aspects, SM 121c comprises an indication of the time or time period as to when the backup is performed. For example, SM 121c may include a time stamp. During a future backup, SM 121c is passed to component 128a to determine the difference in data as compared to component 128a's previous backup data, as indicated by SM 121c. In certain aspects, SM 121c may also indicate, for example, the last database log that was backed up. During a future backup, SM 121c is passed to component 128a to determine the database logs that have been generated since the last database log was backed up.

As shown, storage 110 also stores certain component-related information for use in performing incremental backups for components 128a-128c. For example, storage 110 stores a component profile 112 and a component manifest 114 for each component 128. More specifically, each one of components 128a-128c provides a component manifest 114, comprising backup configuration details and instructions related to performing a backup for component 128. A backup operation performed for a component 128 is based on the configuration details and instructions indicated by the component's manifest 114. In certain aspects, a component manifest 114 may have a JavaScript Object Notation (JSON) file format. In certain aspects, a component manifest 114 of, for example, component 128a, has a list of files and/or directories that component 128a is configured to back up and also a set of scripts to be executed by component 128a or BR manager 136 during a backup. In certain aspects, a component manifest 114 may indicate that one or more of such scripts can be executed before, during, and/or after a backup operation. A component manifest 114 may also indicate dependencies of a component 128, such as component 128a with other components, such as components 128b-128c. For example, Component A may have a dependency for Component B to be reconciled and started before reconciling itself. Also, a more general example relates to how OS components, logging components, watchdog components need to be recovered before recovering other user or application components.

Component profiles 112 comprise profiles relating to components 128a-128c. Each component profile 112, corresponding to a certain component, indicates information relating to how frequently a component should be backed-up, the protocol to be used for backing up the component, a location of where the backup should be stored, etc.

OS 122 is installed and runs "on top of" hardware platform 102. OS 122 includes a kernel 124 and a user space 126. Kernel 124 provides low-level operating system functions, such as thread scheduling, interrupt and exception dispatching, multiprocessor synchronization, memory management, security, TO, networking, inter-process communication, and the like. User space 126 is where one or more components, such as components 128a-128c, can run. Generally an OS may execute many components, but for simplicity, only components 128a-128c are shown. As described above, component 128 refers to any software program, or group of programs, such as a software application, that executes within user space 126.

The data of each component ("component data") (e.g., data that the component utilizes to operate or generates) may be stored in different forms. In one example, component data may be in the form of flat files, which can be backed-up and restored at a file granularity level, where individual files can be selected to be backed-up and restored. As an example, a component having flat file-based component data may be an OS services component, such as a component that provides networking services to an OS. In such an example, the component data may include network configuration information that is stored in the form of flat files. In another example, a component may use the execution of a script to produce certain corresponding component data. For example, in order to obtain or produce data that has changed as compared to a previous backup data associated with a database component 128 (e.g., a Postgres database management component), the component or BR manager 136 may initiate the execution of a script on host 100. In such an example, for BR manager 136 to back up certain tables in the Postgres database, the backup manager initiates the execution of a script (e.g., PG-dump) to obtain the relevant data of the tables.

The component aware incremental backup solution described herein enables each component to independently, or with the assistance of BR manager 136, identify and/or generate data for an incremental backup, regardless of whether such data is in the form of flat files or whether the data is generated by running a script.

In addition to components 128a-128c, FIG. 1 also shows backup scheduler as well as BR manager 136 to be running in user space 126. Backup scheduler 134 is configured to schedule backups for each component based on a corresponding component profile 112 of the component. BR manager 136 is configured to enable a component to determine whether an incremental backup is possible and, if yes, what is the difference in data as compared to the component's previous backup data. Note that in the embodiments described herein a "backup" refers to a backup process while "backup data" refers to the data that is actually stored as a result of the backup process.

Backup Operations

Figure 2:
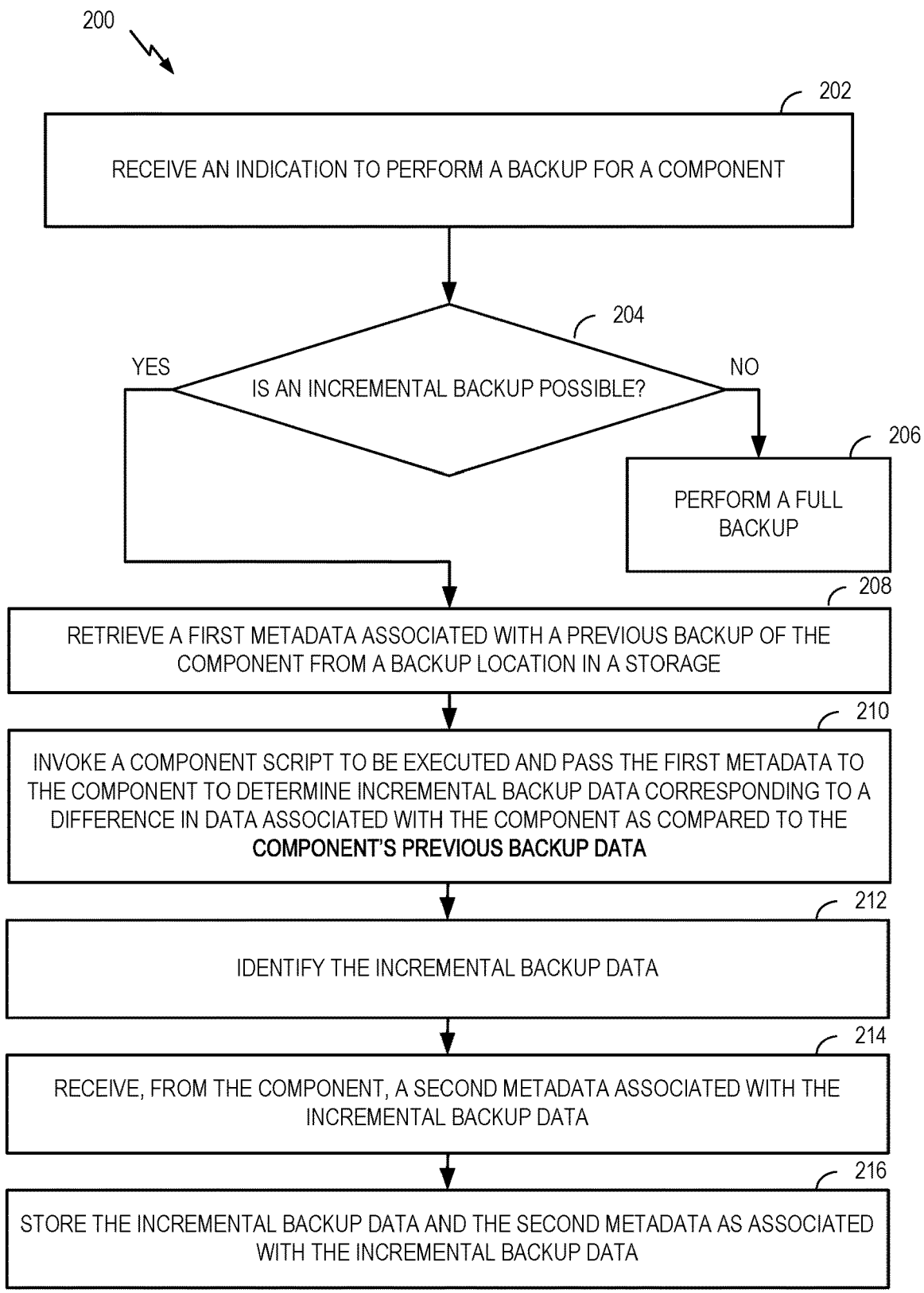
FIG. 2 illustrates example operations for performing an incremental backup procedure, according to certain aspects.

FIG. 2 illustrates operations 200 performed by BR manager 136 to perform an incremental backup, according to certain aspects. Steps 202-222 of operations 200 are described below with reference to FIG. 1. Further, although operations 200 are described in relation to performing an incremental backup for one component, namely component 128a, in some examples, operations 200 may be performed to perform incremental backups for multiple components concurrently.

At block 202, BR manager 136 receives an indication to perform a backup for a component. As described above, backup scheduler 134 is configured to examine a component profile 112 of each component, such as component 128a, and determine when a backup needs to be performed, as indicated by component 128a's component profile 112. Backup scheduler 134 then indicates to BR manager 136 to perform a backup for component 128a based on the determination.

At block 204, BR manager 136 determines whether an incremental backup is possible. In certain aspects, BR manager 136 makes this determination based on whether any previous backup has been performed for component 128a. If not, at block 206, BR manager 136 determines to perform a full backup of data associated with component 128a. In a full backup, all data associated with component 128a is backed-up, unless component 128a instructs otherwise. Also, metadata 120, including GM 122 and SM 121, is generated by component 128a or BR manager 136 for the full backup.

If a previous backup has been performed for component 128a, in certain aspects, BR manager 136 next determines the number of consecutive incremental backups that have been performed for component 128a, in any. If more than a certain threshold number of consecutive incremental backups have been performed for component 128a, in certain aspects, BR manager 136 determines to perform a full backup. The threshold number, in certain aspects, may be user configurable. In certain aspects, the number of consecutive incremental backups is capped because the amount of time it takes to restore a component increases with the number of incremental backups used during the restore process. As such, performing more than a certain number of incremental backups may, in certain cases, result in a longer than acceptable amount of restore time. If BR manager 136 determines that the number of consecutive incremental backups does not exceed the threshold number, BR manager 136 determines to perform an incremental backup for component 128a.

In the example of component 128a, the backup associated with backup data 118b is an incremental backup while the backup associated with backup data 118a is the first full backup of component 128a. In such an example, BR manager 136 determines that only one incremental backup, corresponding to backup data 118b, has been performed for the component and, therefore, determines to perform another incremental backup, which later results in the storage of backup data 118c in storage 110.

At block 208, BR manager 136 retrieves a first metadata associated with a previous backup of the component from a backup location in a storage. The first metadata may be metadata associated with any previous backup, including a last backup. In certain aspects, when metadata associated with the last backup is available, BR manager 136 retrieves that metadata, in which case, the first metadata refers to metadata of the last backup. In the example used to illustrate operations 200, BR manager 136 retrieves metadata 120b associated with backup data 118b, which is the last incremental backup, from backup location 116 in storage 110. In other aspects, if metadata associated with the last backup is not available, metadata of any other previous backups may be used. For example, metadata 120a of a backup associated with backup 118a may be used in such aspects. As described above, in the example used herein, it is assumed that metadata 120b is available.

At block 210, BR manager 136 invokes a component script to be executed and passes the first metadata to the component to determine incremental backup data corresponding to a difference in data associated with the component as compared to the component's previous backup data. For example, in certain aspects, after determining that an incremental backup is to be performed for component 128a, BR manager 136 accesses a component manifest 114 of component 128a to examine the instructions for performing an incremental backup. In one example, component manifest 114 of component 128a indicates that a component script should be executed for the incremental backup. As described above, in certain aspects, the component script in component manifest 114 may include a set of scripts for execution before, during, and/or after a backup operation. For example, the component script may comprise a set of pre-backup scripts, backup scripts, and post-backup scripts.

In addition to invoking the component script, as described above, BR manager 136 also passes metadata 120b associated with backup 118b to component 128a. In certain aspects, passing metadata 120b to component 128a comprises passing metadata 120b to the component script (e.g., which may act as a hook or a plugin for component 128a) that is being executed. In certain aspects, BR manager 136 also indicates the type of backup that should be performed to component 128a. For example, BR manager 136 indicates to component 128a to perform an incremental backup based on the determination made in block 204.

By invoking the component script, BR manager 136 first executes one or more the pre-backup scripts. Executing pre-backup scripts perform a backup validation prior to initiating the actual backup. A backup validation is performed to ensure that the backup (e.g., the incremental backup that is scheduled to be performed) is valid and can actually be used to perform a restore. Performing a backup validation may, for example, include checking the health of the component or the state of the database etc. If the backup validation fails, the backup operation also fails and component 128a reports that host 100 is not in the right state for a backup to be performed. In such an example, a user may either remediate host 100 or restore host 100 using earlier backups. In certain aspects, a pre-backup script may be executed by component 128a or BR manager 136 to quiesce (e.g., pause) certain functionalities of component 128a before the backup. For example, if component 128a is a database application, component 128a may pause the component's database-related operations right before the backup.

In certain aspects, once the backup validation is performed, component 128a may independently, or with the assistance of BR manager 136, identify the incremental backup data that should be backed-up based on metadata (e.g., metadata 120b), as described in more detail with respect to block 212. The incremental backup data refers to a difference in data associated with component 128a as compared to backup data 118 corresponding to the previous backup. In other words, when component 128a's data is flat file-based, the incremental backup data corresponds to the flat files that have changed or been added as compared to previous to the previous backup data, such as backup data 118b. In other examples, the incremental backup data may correspond to data that has been generated or recorded after the previous backup data (e.g., data recorded in a database, such as a Postgres database, etc.).

At block 212, BR manager 136 identifies the incremental backup data. In certain aspects, using metadata 120b, component 128a is configured with certain logic to determine the incremental backup data. For example, as described above, metadata 120b comprises SM 121b that provides an indication of the data that has been backed up by each of the previous backups and/or when each of the previous backup operations was performed. As an example, SM 121b may indicate that files 1-7 of component 128a have been backed-up by previous backups associated with backup data 118b and 118a. In such an example, component 128a may be configured with certain logic to determine what files have changed or been added since the last backup associated with backup data 118b. As a result, component 128a may, for example, determine that files 2-3 and 8-10 need to be backed-up and provide an indication about those files to BR manager 136. For example, component 128a may indicate universally unique identifications (e.g., absolute path of the files on the disk) of such files to BR manager 136.

In another example, component 128a may execute a script to generate the incremental backup data. For example, component 128a may examine SM 121b and determine that the last backup, associated with backup data 118b, was performed at time B and, therefore, execute a script to generate all data that has been recorded or produced by or through component 128a since time B. In another example, component 128a may examine SM 121b and determine that the last backed-up log, associated with backup data 118b, was log B, based on which component 128a may execute a script to generate all the logs that have been generated since log B was backed up. As an example, a PG-dump script may be executed to produce all Postgres database archives or records that have been generated since the last backup. In such an example, BR manager 136 then identifies the incremental backup data as data being generated by the execution of the script and then dispatches the incremental backup data to the backup location.

In certain aspects, component 128a may not possess any logic to be able to use metadata 120b to determine the incremental backup data. In such aspects, component 128a may call an application programming interface (API) (e.g., a representational state transfer (REST) or RESTful API) that is provided by BR manager 136 to help component 128a determine the incremental backup data. In other words, in such aspects, it is BR manager 136 that provides the logic for identifying the incremental backup data. In such aspects, if component 128a stores data in the form of flat files, component 128a may indicate a request to BR manager 136 to identify the incremental backup data in a certain directory location. In certain aspects, the directory location may be indicated by component manifest 114 of component 128a.

In certain aspects, in response to the request from component 128a, BR manager 136 then generates hash values or checksums of files in the directory location that are associated with the current state of component 128a. For example, BR manager 136 creates hash values of files 1-10 and compares the hash values indicated by SM 121b. BR manager 136 then identifies any hash values associated with the current state of component 136 that are not the same as any hash values indicated by SM 121b. For example, BR manager identifies hash values associated with files 2 and 3 as not matching hash values indicated by SM 121b for those same files. This indicates that those files have been changed/updated. BR manager may also identify hash values associated with files 8-10 as not matching any hash values indicated by SM 121b. BR manager 136 may, therefore, identify files 8-10 as files that have been added by component 128a since the last backup 118b. As a result of the comparisons described above, BR manager 136 identifies files 2-3 and 8-10 as files that need to be backed up.

As described above, a component manifest 114 may indicate information about a list of files for use during the backup operations. For example, component manifest 114 may indicate certain files that should always be backed-up, regardless of whether there has been any data change in the file since the last backup. In such an example, BR manager 136 may not waste compute resources to generate hash values for such files for the comparison, as described above, and may instead proceed to back up such files. In another example, component manifest 114 may indicate certain files that should never be backed-up. In such an example, BR manager 136 may again not waste compute resources to generate hash values for such files and skip the backup of such files.

In certain aspects, component 128a generates or records data that is not in the form of flat files. In such an example, as described above, component 128a provides certain scripts in component manifest 114, which can be executed to generate the incremental backup data based on information indicated by SM 121b. For example, as described above, SM 121b may indicate time B as the time when the backup associated with backup data 118b occurred. Based on time B, BR manager 136 is able to produce any data generated by component 128a since time B by running a script in component manifest 114 of component 128a. In another example, SM 121b may indicate the last backed-up log or archive. Based on that information, BR manager 136 is able to run a script to produce any logs or archives, or any data therein, generated by component 128a after the last backed-up log was generated. BR manager 136 then identifies any data generated by the execution of the script as data that needs to be backed up.

In certain aspects, once the incremental backup data is identified, component 128a may execute a pre-backup script to estimate the size of the incremental backup data. This is so that BR manager 136 is able to determine whether there is enough space in backup location 116 for the incremental backup data and the corresponding metadata to be stored. Using this estimation, component 128a is able to predict the amount of time it would take for the backup to be complete. In certain aspects, component 128a indicates that prediction to a user on, for example, a user interface.

At block 214, BR manager 136 receives, from the component, a second metadata associated with the incremental backup. For example, BR manager 136 receives metadata 120c from component 128a that is associated with the backup that is to be performed by BR manager 136. In certain aspects, component 128a is able to generate metadata 120c by calling an API provided by BR manager 136. Metadata 120c comprises SM 121c, which comprises information about backup data 118c. For example, SM 121c may indicate that files 2-3 and 8-10 are backed-up by a backup associated with backup data 118c. SM 121c may also point to previous backups associated with backup data 118b and 118a as including backup data relating to files 1 and 4-7. In certain aspects, SM 121c may also indicate a time or time period of when a backup associated with backup data 118c is performed. In certain aspects, SM 121c may indicate the last log or archive that is backed up with a backup associate with backup data 118c.

At block 216, BR manager 216 stores the incremental backup data and the second metadata as associated with the incremental backup. Continuing with the example above, BR manager 136 performs a backup by storing the incremental backup data, shown as backup data 118c, as well as metadata 120c in storage 110. In certain aspect, the incremental backup data is compressed and encrypted before being stored. Note that the order of first receiving the second metadata from the component and then storing the incremental backup data is merely exemplary. In another example, BR manager 216 stored the identified incremental backup data, receives the second metadata from the component, and then stores second metadata.

In certain aspects, after an incremental backup is performed, BR manager 136 or component 128a may execute one or more post-backup scripts as provided by a component manifest 114. In one example, a post-backup script may be executed to restart component 128a, whose operations had been paused by the execution of a pre-backup script.

Restore Operations

Figure 3:
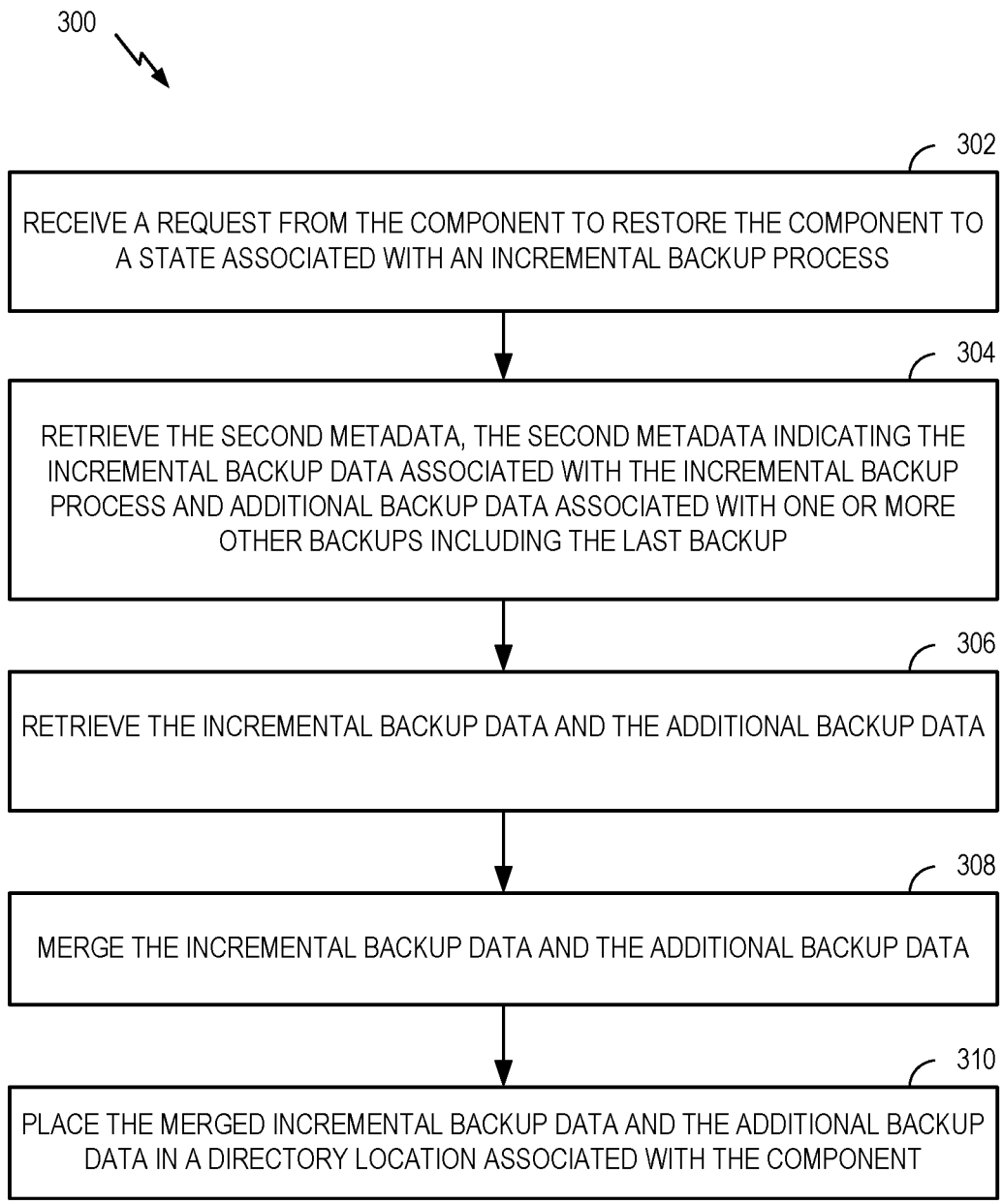
FIG. 3 illustrates example operations for performing a restore procedure, according to certain aspects.

In certain cases, a component, such as component 128a, may request BR manager 136 to restore the component. FIG. 3 illustrates operations 300 performed by BR manager 136 to perform a restore, according to certain aspects. Steps 302-310 of operations 300 are described below with reference to FIG. 1. Further, although operations 300 are described in relation to restoring one component, namely component 128a, in other examples, operations 300 may be performed to restore multiple components concurrently.

At block 302, BR manager 136 receives a request from a component to restore the component to a state associated with an incremental backup. For example, component 128a calls an API to request BR manager 136 to restore component 138 to a state associated with the incremental backup, performed by operations 200, corresponding to backup data 118c. In certain aspects, component 128a's request to BR manager 136 may not identify a certain backup, in which case, BR manager 136 may itself select a previous backup, such as the last backup associated with backup data 118c to restore component 128a to a state associated with such a backup. In certain aspects, BR manager 136 may run one or more pre-restore scripts to ensure that component 128a and any of its dependent components are not running. In addition, BR manager 136 may run one or more pre-restore scripts to reset component 128a to a state associated with the component's freshly-installed state.

At block 304, BR manager 136 retrieves the second metadata, the second metadata indicating the incremental backup data associated with the incremental backup and additional backup data associated with one or more other backups including the last backup. For example, BR manager 136 retrieves metadata 120c comprising SM 121c, which indicates incremental backup data 118c that was stored as a result of the incremental backup performed by operations 200 as well as additional backup data, which comprises backup data 118b and 118a stored as a result of the previous backups. As described above, SM 121c may, for example, indicate backup data associated with files 2-3 and 8-10 is stored as backup data 118c, backup data associated with files 1 and 4 is stored as backup data 118b, and backup data associated with files 5-7 is stored as backup data 118a.

In another example, SM 121c may indicate certain backup data associated with transaction logs or archives, such as transaction logs or archives 1-11. For example, SM 121c may indicate certain backup data associated with transaction logs or archives 10-11, stored as backup data 118c, certain backup data, associated with transaction logs or archives 5-9, stored as backup data 118b, and certain backup data, associated with transaction logs or archives 1-4, stored as backup data 118a. Accordingly, based on SM 121c, BR manager 136 is able to create a map of which files or data (e.g., logs or archives) need to be retrieved from which backup data (e.g., disk image).

At block 306, BR manager 136 retrieves the incremental backup data and the additional backup data. For example, BR manager 136 retrieves incremental backup data 118c and backup data 118a and 118b.

At block 310, BR manager 136 merges the incremental backup data and the additional backup data. For example, BR manager 136 merges backup data 118a, 118b, and 118c. In certain aspects, BR manager 136 may run one or more scripts to extract and merge the data. For example, to restore Postgres's data, BR manager 136 may execute a script, such as pg-restore, to extract and merge the logs associated with each one of backup data 118a, 118b, and 118c.

At block 310, BR manager 136 places the merged incremental backup data and the additional backup data in a directory location associated with the component. For example, BR manager 136 places the merged backup data 118a, 118b, and 118c in an application folder associated with component 128a. In certain aspects, BR manager 136 decrypts and decompresses the merged backup data 118a, 118b, and 118c before placing them in the application folder associated with component 128a. At this point, component 128a and any of its dependent components are not actually running. As such, BR manager 136 may run one or more post-restore script to start component 128a and its dependent component(s). However, before component 128a and its dependent component(s) are started, it may be advantageous to reconcile them with the state they were in prior to the restore operations, as described below.

Reconciliation Operations

After a backup is performed for a certain component, the component's state (e.g., configuration state) may be updated.

If the component is then restored from the backup, the component reverts back to a state (e.g., configuration state) it was in when the backup was taken and not to the state the component was in right before the restore. However, if a component manages other systems or shares its state with other systems, the component data can potentially be out of sync with the rest of the system(s) if it is restored to a state it was in when the backup was taken. In such cases, the user may not be able to operate the out-of-sync component in a manner that the component was being operated with the other systems right before the restore, causing significant issues. Existing backup/restore solutions do not provide any mechanism on how to reconcile the component's state after the restore with the component state's before the restore.

Accordingly, certain aspects described herein provide a mechanism for components to be reconciled with the state they were in prior to the restore operation.

In certain aspects, after a component, such as component 128a, is restored, BR manager 136 may invoke a script (e.g., plugin provided by the component) to be executed that reconciles component 128a's state after the restore with component 128a's state right before the restore. In certain aspects, BR manager 136 may not report the restore process as completed until the reconciliation is performed by component 128a or until component 128a requests BR manager 136 to unblock the completion of the restore process (e.g., in the case of a lazy reconciliation, as described below). In certain aspects, by running the script, component 128a may determine that no reconciliation is needed because, for example, the purpose of the restore may have been to revert the state of component 128a back to when it was backed up.

In other aspects, component 128a may determine that reconciliation is necessary and retrieve configuration data from one or more other systems. For example, when a virtual machine (VM) running a server application is restored, the state of the restored server VM may not correspond with the current state of the guest VMs that are being served by the server VM. In such an example, the state of the server VM may be updated based on information retrieved from the host running the server VM and/or the other guest VMs. As an example, before the server VM is restored but after it was backed-up, it may be configured to communicate with the guest VMs through a virtual switch. However, the backup data the server VM is restored from may not include the virtual switch configuration. In such an example, the restored server VM is not able to communicate with the other guest VMs through the virtual switch unless it receives the virtual switch configuration from, for example, the host running the server VM. The configuration information, in that example, may be reconciled into a database associated with the server application before the server application can be operated as before.

In certain aspects, component 128a may run the reconciliation script but determine to perform the actual reconciliation at a later time. This may be referred to as performing a lazy reconciliation. If component 128a determines to perform a lazy reconciliation, in certain aspects, component 128a may indicate to BR manager 136 to allow for component 128a to be fully restored. Once the restore operation is fully complete, component 128a may reconcile itself at a later time.

Figure 4:
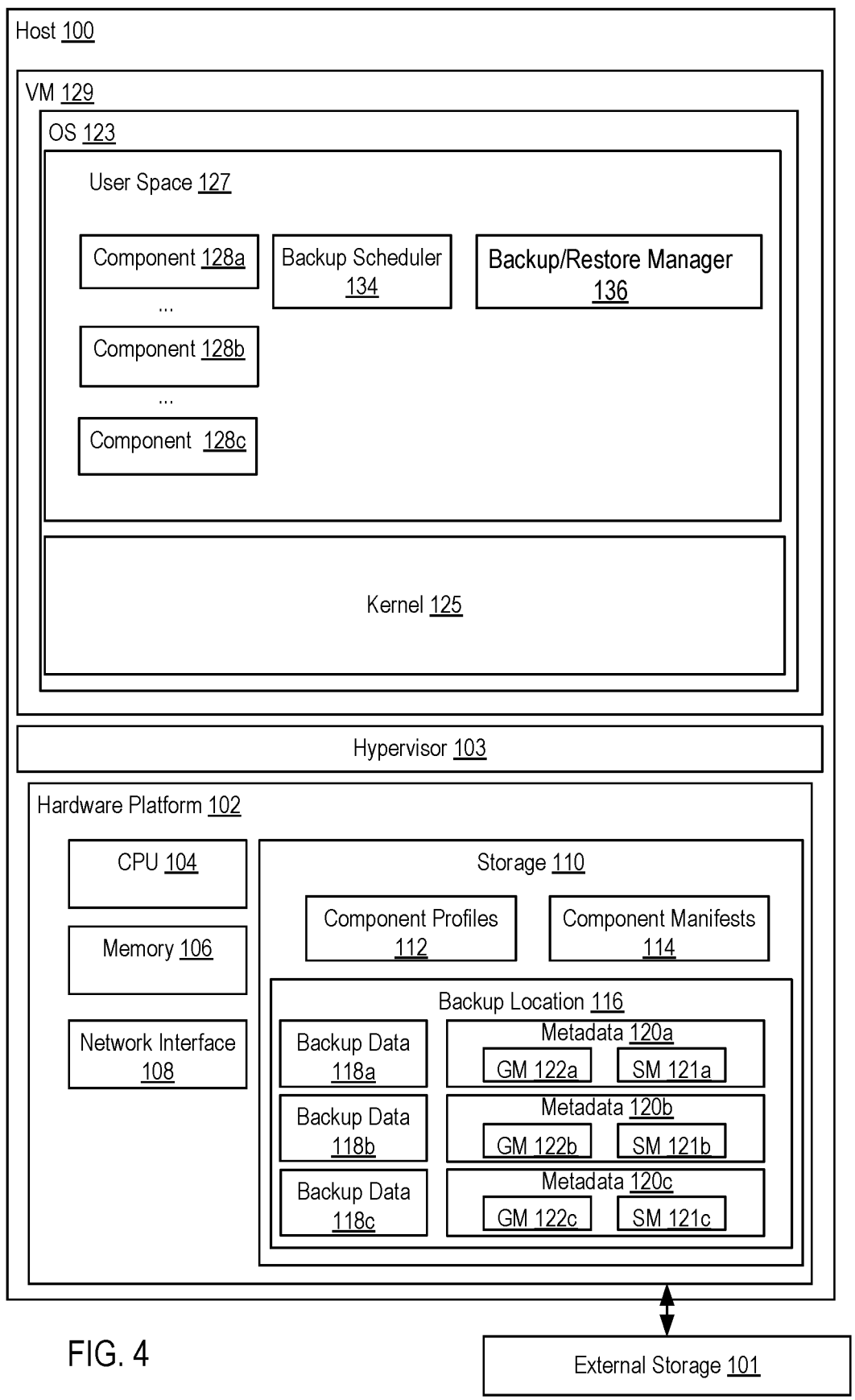
FIG. 4 depicts a block diagram of another computing system in which one or more embodiments of the present disclosure may be utilized.

Although operations 200 and 300 were described in relation to one or more components 128a-128c running in OS 122 of a host 100, in certain aspects, components 128a-128c may execute within an operating system of a VM in host 100, as shown in FIG. 4. In certain aspects, components 128a-128c may themselves be VMs running "on top of" a hypervisor of host 100 (not shown).

FIG. 4 shows host 100 being configured with a virtualization layer, referred to herein as hypervisor 103, that abstracts processor, memory, storage, and networking resources of hardware platform 102 into multiple VMs, such as VM 129. VMs on the same host 100 may use any suitable overlaying guest operating system(s), shown as OS 123, and run concurrently with the other VMs. As shown, OS 123 comprises a kernel 125 and a user space 127, in which component 128a-128c as well as backup scheduler 134 and backup/restore manager 136 are running.

Hypervisor 103 architecture may vary. In some aspects, hypervisor 103 can be installed as system level software directly on the hosts 100 (often referred to as a "bare metal" installation) and be conceptually interposed between the physical hardware and the guest operating systems executing in the VMs. Alternatively, hypervisor 103 may conceptually run "on top of" a conventional host operating system in the server. In some implementations, hypervisor 103 may comprise system level software as well as a privileged VM machine (not shown) that has access to the physical hardware resources of the host 100. In such implementations, a virtual switch, virtual tunnel endpoint (VTEP), etc., along with hardware drivers, may reside in the privileged VM. One example of hypervisor 103 that may be used is a VMware ESXi™ hypervisor provided as part of the VMware vSphere® solution made commercially available from VMware, Inc. of Palo Alto, Calif.

As described above, although not shown, in certain aspects, a component may refer to a VM itself. For example, VM 129 may be a component that may be backed up, restored, and reconciled by operations 200 and 300 described above.

Accordingly, the component aware incremental backup, restore, and reconciliation solution described herein provides a technical solution for a technical problem associated with the existing solution's inability to determine the incremental change in data associated with a component since a previous backup of the component. As described above, as a result of this, many existing solutions perform either unnecessary incremental backups or incremental backups that are much larger than the size of actual data change. This results in an inefficient use of compute and storage resources. The component aware incremental backup, restore, and reconciliation solution described herein provides a solution for components to independently determine whether to perform a full backup or an incremental backup and to generate metadata (e.g., SM) for each backup that later enables the component to also independently identify the data that has changed as compared to a previous backup of the component. The component aware incremental backup, restore, and reconciliation solution described herein also provides a solution for a component to be restored based on metadata indicating what data has been backed up by which backup and also where each backup data segment resides (e.g., in what disk image, storage location, etc.). The component aware incremental backup, restore, and reconciliation solution described herein also provides the opportunity and mechanism for each component to be reconciled before the restore operation is complete. The component aware incremental backup, restore, and reconciliation solution, therefore, reduces the storage resources, compute cycles, and time associated with performing backup, restore, and reconciliation operations.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of performing an incremental backup process of a first component and second component, comprising:
   reading a first component manifest that includes first backup configuration details and first instructions related to performing a backup for the first component, wherein the first component manifest indicates one or more dependencies of the first component on one or more additional components;
   reading a second component manifest that includes second backup configuration details and second instructions related to performing a backup for the second component wherein the second backup configuration details and the second instructions related to performing a backup are different from the first backup configuration details and the first instructions related to performing a backup;
   performing the incremental backup by performing the following steps in accordance with the first backup configuration details and first instructions included in the first manifest for the first component and performing the following steps in accordance with the second backup configuration details and second instructions included in the second manifest for the second component:
      retrieving a first metadata associated with a previous backup process of a component from a backup location in a storage, wherein the component is one of the first component or the second component;
      passing the first metadata to the component for determining incremental backup data of the component corresponding to a difference between current data of the component and data of the component associated with the previous backup process;
      receiving information indicative of the incremental backup data from the component;
      receiving, from the component, a second metadata associated with the incremental backup process; and
      storing the incremental backup data and the second metadata as associated with the incremental backup process.

2. The method of claim 1, wherein receiving information indicative of the incremental backup data further comprises receiving the incremental backup data from the component.

3. The method of claim 1, wherein:
   the first metadata comprises one or more hash values of a first one or more files associated with the previous back up process; and
   the information indicative of the incremental backup data further comprises information indicative of a storage location; and
   the method further comprises:
      generating hash values of a second set of files in the storage location, the second set of files being associated with a current state of the component;
      determining as a third set of hash values any hash values of the second set of files that are not the same as any hash values of the first set of files; and
      identifying the incremental backup data as data associated with the third set of hash values.

4. The method of claim 3, wherein the storage location is a directory location.

5. The method of claim 1, wherein the information indicative of the incremental backup data further comprises a request to execute a script for producing the incremental back-up data, the method further comprising:
  executing the script to produce the incremental backup data.

6. The method of claim 1, wherein:
the component is configured to execute a script to identify the incremental backup data;
executing the script generates one or more logs; and
the component identifies the incremental backup data based on the one or more logs, which indicate what data has been generated since a time at which the previous backup process occurred.

7. The method of claim 1, further comprising:
receiving a request from the component to restore the component to a state associated with the incremental backup process;
retrieving the second metadata, the second metadata indicating the incremental backup data associated with the incremental backup process and additional backup data associated with one or more other backup processes including the previous backup process;
retrieving the incremental backup data and the additional backup data;
merging the incremental backup data and the additional backup data; and
placing the merged incremental backup data and the additional backup data in a storage location associated with the component.

8. The method of claim 7, further comprising:
invoking a script to be executed for reconciling a state of the component after it is restored with a state of a system the component is associated with.

9. The method of claim 1, further comprising determining, based on the one or more dependencies of the first component on the one or more additional components, to reconcile a state of the one or more additional components before reconciling a state of the first component based on the incremental backup data.

10. An apparatus, comprising:
a non-transitory memory comprising executable instructions performing an incremental backup process of a first component and second component; and
a processor in data communication with the non-transitory memory and configured to execute the instructions to cause the apparatus to:
  read a first component manifest that includes first backup configuration details and first instructions related to performing a backup for the first component, wherein the first component manifest indicates one or more dependencies of the first component on one or more additional components;
  read a second component manifest that includes second backup configuration details and second instructions related to performing a backup for the second component wherein the second backup configuration details and the second instructions related to performing a backup are different from the first backup configuration details and the first instructions related to performing a backup;
  perform the incremental backup by performing the following steps in accordance with the first backup configuration details and first instructions included in the first manifest for the first component and performing the following steps in accordance with the second backup configuration details and second instructions included in the second manifest for the second component;
  retrieve a first metadata associated with a previous backup process of a component executed by the processor from a backup location in a storage, wherein the component is one of the first component or the second component;
  pass the first metadata to the component for determining incremental backup data of the component corresponding to a difference between current data of the component and data of the component associated with the previous backup process;
  receive information indicative of the incremental backup data from the component;
  receive, from the component, a second metadata associated with the incremental backup process; and
  store the incremental backup data and the second metadata as associated with the incremental backup process.

11. The apparatus of claim 10, wherein the processor being configured to cause the apparatus to receive the information indicative of the incremental backup data further comprises the processor being configured to cause the apparatus to receive the incremental backup data from the component.

12. The apparatus of claim 10, wherein:
the first metadata comprises one or more hash values of a first one or more files associated with the previous back up process; and
the information indicative of the incremental backup data further comprises information indicative of a storage location; and
the processor is further configured to cause the apparatus to:
  generate hash values of a second set of files in the storage location, the second set of files being associated with a current state of the component;
  determine as a third set of hash values any hash values of the second set of files that are not the same as any hash values of the first set of files; and
  identify the incremental backup data as data associated with the third set of hash values.

13. The apparatus of claim 12, wherein the storage location is a directory location.

14. The apparatus of claim 10, wherein the information indicative of the incremental backup data further comprises a request to execute a script for producing the incremental back-up data, and wherein the processor is further configured to cause the apparatus to:
execute the script to produce the incremental backup data.

15. The apparatus of claim 14, wherein:
the component is configured to execute a script to identify the incremental backup:
executing the script generates one or more logs;
the component identifies the incremental backup data based on the one or more logs, which indicate what data has been generated since a time at which the previous backup process occurred.

16. The apparatus of claim 10, wherein the processor is further configured to cause the apparatus to:
receive a request from the component to restore the component to a state associated with the incremental backup process;
retrieve the second metadata, the second metadata indicating the incremental backup data associated with the incremental backup process and additional backup data associated with one or more other backup processes including the previous backup process;

retrieve the incremental backup data and the additional backup data;

merge the incremental backup data and the additional backup data; and place the merged incremental backup data and the additional backup data in a storage location associated with the component.

17. The apparatus of claim 16, wherein the processor is further configured to cause the apparatus to:

invoke a script to be executed for reconciling a state of the component after it is restored with a state of a system the component is associated with.

18. A non-transitory computer readable medium having instructions stored thereon that, when executed by a computing system, cause the computing system to perform a method of performing an incremental backup process for a first component and a second component configured to be executed by the computing system, the method comprising:

reading a first component manifest that includes first backup configuration details and first instructions related to performing a backup for the first component, wherein the first component manifest indicates one or more dependencies of the first component on one or more additional components:

reading a second component manifest that includes second backup configuration details and second instructions related to performing a backup for the second component wherein the second backup configuration details and the second instructions related to performing a backup are different from the first backup configuration details and the first instructions related to performing a backup;

performing the incremental backup by performing the following steps in accordance with the first backup configuration details and first instructions included in the first manifest for the first component and performing the following steps in accordance with the second backup configuration details and second instructions included in the second manifest for the second component;

retrieving a first metadata associated with a previous backup process of a component from a backup location in a storage, wherein the component is one of the first component or the second component;

passing the first metadata to the component for determining incremental backup data of the component corresponding to a difference between current data of the component and data of the component associated with the previous backup process;

receiving information indicative of the incremental backup data from the component;

receiving, from the component, a second metadata associated with the incremental backup process; and storing the incremental backup data and the second metadata as associated with the incremental backup process.

19. The non-transitory computer readable medium of claim 18, wherein receiving information indicative of the incremental backup data further comprises receiving the incremental backup data from the component.

20. The non-transitory computer readable medium of claim 18, wherein:

the first metadata comprises one or more hash values of a first one or more files associated with the previous back up process; and the method further comprises:

the information indicative of the incremental backup data further comprises information indicative of a storage location; and the method further comprises:

generating hash values of a second set of files in the storage location, the second set of files being associated with a current state of the component;

determining as a third set of hash values any hash values of the second set of files that are not the same as any hash values of the first set of files; and identifying the incremental backup data as data associated with the third set of hash values.

21. The non-transitory computer readable medium of claim 18, wherein the information indicative of the incremental backup data further comprises a request to execute a script for producing the incremental back-up data, and wherein the method further comprises:

executing the script to produce the incremental backup data.

* * * * *